(12) United States Patent
Patton

(10) Patent No.: US 7,657,447 B2
(45) Date of Patent: *Feb. 2, 2010

(54) SYSTEM AND METHOD FOR IDENTIFYING AND EVALUATING NANOMATERIAL-RELATED RISK

(75) Inventor: William Eugene Patton, Avon, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/347,787

(22) Filed: Dec. 31, 2008

(65) Prior Publication Data

US 2009/0132299 A1    May 21, 2009

Related U.S. Application Data

(63) Continuation of application No. 12/170,299, filed on Jul. 9, 2008, which is a continuation of application No. 11/986,275, filed on Nov. 20, 2007.

(51) Int. Cl.
*G06Q 40/00*    (2006.01)
(52) U.S. Cl. ............................................. 705/4
(58) Field of Classification Search .................. 705/4, 705/1; 977/700
See application file for complete search history.

(56) References Cited

U.S. PATENT DOCUMENTS

| | | | |
|---|---|---|---|
| 4,975,840 A | 12/1990 | DeTore et al. | |
| 6,117,643 A | 9/2000 | Simpson et al. | |
| 6,912,502 B1 * | 6/2005 | Buddle et al. | 705/1 |
| 7,330,820 B1 * | 2/2008 | Heyne et al. | 705/4 |
| 2004/0167793 A1 | 8/2004 | Masuoka et al. | |
| 2005/0055248 A1 | 3/2005 | Helitzer et al. | |
| 2005/0102172 A1 * | 5/2005 | Sirmans, Jr. | 705/4 |
| 2005/0154618 A1 | 7/2005 | Kita | |
| 2006/0020814 A1 * | 1/2006 | Lieblich et al. | 713/182 |
| 2006/0026044 A1 | 2/2006 | Smith | |
| 2006/0190177 A1 | 8/2006 | Grant et al. | |
| 2006/0271414 A1 * | 11/2006 | Fenton et al. | 705/4 |
| 2008/0033767 A1 | 2/2008 | Brown | |

OTHER PUBLICATIONS

Tegart, Greg, Dec. 1, 2006. Critical issues in the commercialization of nanotechnologies. Innovation: Management, Policy, and practice. p. 1-14.*

McMenamin, Helen, Assess riks of nanoproducts say experts and enviromentalists. Mar. 26, 2007. Pesticide and Toxic Chemical News. p. 1-4.*

(Continued)

*Primary Examiner*—James P Trammell
*Assistant Examiner*—Jamie H Swartz
(74) *Attorney, Agent, or Firm*—Ropes & Gray LLP

(57) ABSTRACT

A system, method, and processor-readable medium are provided for quantitatively evaluating risk associated with nanotechnology. An insurance company computing system obtains nanomaterial-related data from a variety of sources, including nanomaterial sensors such as differential mobility analyzers located on-site at an insured facility. The insurance computing system uses the obtained data and a computerized model to compute a risk score that is used in evaluating the insurability of the facility or the operating entity. An insurance policy or modifications to an existing insurance premium are subsequently produced based on the computed risk score.

19 Claims, 6 Drawing Sheets

OTHER PUBLICATIONS

DuPont. Nano Risk Framework. Jun. 2007. p. 1-104.*

Robichaud et al. Relative Risk Analysis of Several Manufactured Nanomaterials: An Insurance Industry Context. Environ. Sci. Technol. 39:8985-94 (2005).*

Lubrano-Birken, Brenda. Problem Recognition in Legal Analyses Involving Nanotechnology. UAlbany College of Nanoscale Science and Engineering. (Dec. 21, 2007).

Valle, Louise. Nanotechnology—Insurance Industry Perspectives. Chubb Group. (Dec. 2006).

Lauterwasser, Christoph. Small Sizes that Matter: Opportunities and Risks of Nanotechnologies. Allianz AG. Munich, Germany. (Dec. 18, 2007).

Nanotechnology: Insurance Industry Perspectives. Chubb Group. (Dec. 2006).

Blaunstein, Robert. Nanotechnology: The Plastics of the 21st Century? Guy Carpenter & Company, Inc. (2006).

Blaunstein, Robert. An Unfamiliar Exposure. Insurance Networking News. (Nov. 2006).

Blaunstein, Robert. Nanotechnology and Insurance. American Association of Insurance Services. Presentation at Annual Meeting. Charleston, South Carolina. (Apr. 23, 2007).

Blaunstein, Robert. Nanotechnology Webcast. Regulatory Affairs Professionals Society. (Nov. 14, 2007.

Hett, Annabelle et al. Nanotechnology: Small matter, many unknowns. Swiss Reinsurance Company. (2004).

CST Nanotechnology: Meeting with Thomas Epprecht, Expert Emerging Risks. Swiss Reinsurance Company. (Dec. 14, 2006).

No Small Task: Managing Unknown Risks in the Age of Nanotechnology. The Chubb Corporation. http://www.chubb.com/corporate/chubb4987.html. (Apr. 5, 2006).

The appropriateness of existing methodologies to assess the potential risks associated with engineered and adventitious products of nanotechnologies. European Commission Health & Consumer Protection Directorate-General. SCENIHR/002/05. (Mar. 10, 2006).

Linkov et al. Multi-Criteria Decision Analysis and Environmental Risk Assessment for Nanomaterials. Journal of Nanoparticle Research. 9:543-54 (2007).

Sweet, et. al., "Nanotechnology-Life-Cycle Risk Management," Human and Ecological Risk Assessment, 12:3, 528 (Jun. 1, 2006).

* cited by examiner

400

| | Toxicity | Volume | Encased / Bound | Mobility | Handling Risks | Environ./End of Life | Material Phase | Risk Score |
|---|---|---|---|---|---|---|---|---|
| Nanomaterial 1 | 3 | 3 | 3 | 3 | 2 | 1 | 1 | 800 |
| Nanomaterial 2 | 1 | 3 | 3 | 2 | 3 | 2 | 2 | 640 |
| Nanomaterial 3 | 1 | 1 | 2 | 1 | 1 | 2 | 3 | 215 |

402 ─ 403

| Narrative key | | | |
|---|---|---|---|
| Toxicity/Exposure | 1=No/Low | 2=Medium | 3 = High |
| Volume/Quantity | 1=Milligrams | 2=Grams | 3=Kilograms+ |
| Encased/Bound | 1=Solid/Enclosed | 2=Liquid/Solid | 3=Direct Handling |
| Mobility | 1=Low | 2=Medium | 3=High |
| Handling Risks | 1=Low | 2=Average | 3=High |
| Environment/End of Life Risk | 1=Low | 2=Moderate | 3=High |
| Materials Phase | 1=Research | 2=Primary Mftr | 3=Second Mftr |
| Risk Score | 200-300 = Low | 300-550 = Medium | 550-900 = High |

SYSTEM AND METHOD FOR IDENTIFYING AND EVALUATING NANOMATERIAL-RELATED RISK

CROSS-REFERENCE TO RELATED APPLICATION

This Application is a continuation of U.S. patent application Ser. No. 12/170,299 filed on Jul. 9, 2008 which is a continuation of U.S. patent application Ser. No. 11/986,275 filed on Nov. 20, 2007, the entire contents of which are incorporated herein by reference.

BACKGROUND OF THE INVENTION

In general, the invention relates to identifying risks associated with nanomaterials. In particular, the invention relates to systems and methods for quantitatively characterizing risk associated with nanomaterials for the purpose of underwriting insurance policies.

Nanotechnology is the use of molecules and structures with at least one dimension roughly between 1 and 100 nanometers. Such structures and particles are referred to herein as "nanoparticles". Nanomaterials include products that include nanoparticles as well nanoparticles, themselves. A nanometer is one billionth of a meter, and a human hair measures approximately 50,000 nanometers across. Nanotechnology is the application of these nanostructures into useful nanoscale devices.

Nanotechnologies have been hailed by many as the next industrial revolution, likely to change everything from the cars we drive to the clothes we wear to the medical treatments our doctors can offer. Despite their small size, nanotechnologies offer tremendous benefits. From new cancer therapies to pollution-eating compounds, from more durable consumer products to detectors for biohazards like anthrax, nanotechnologies are changing the way people think about the future.

Examples of current nanotechnology projects cover agriculture, food, health, semiconductors, textiles and energy sectors. Developments include targeted drug delivery, nanosensors in packaging to monitor content, stain and wrinkle resistant cloth, micro-batteries and ultra-capacitors. Already established uses include self-cleaning glass, protective coatings on sunglasses, sunscreens and cosmetics. Government reports predict that nanotechnology markets are estimated to reach a value of trillions of dollars within the decade.

However, the health and environmental risks posed by nanomaterials or more particularly, free nanoparticles are still not clearly understood. Although most nanomaterials are generally well integrated into final consumer or business products and thus can do relatively little damage, released nanoparticles, which can for instance appear during production, over the product life cycle or during end-of-life disposal, or during remanufacturing or recycling, could be a problem. For example, there is a risk that they could be inhaled or ingested or migrate in through the skin and then cause damage.

There is a gap between the scope for innovating new uses for nanomaterials and the corresponding understanding of the consequent risks to humans and the environment. Additionally, the impact of an exposure to humans may not be directly evident until many years later, leading to similar problems as were experienced with asbestos and benzene (an aromatic component of gasoline which has been found to cause cancer).

By identifying and understanding these risks, insurance companies can offer competent risk management support to their clients who are active in this sector. Thus, a need exists in the art for a system to identify and evaluate the risk posed by nanomaterials.

SUMMARY OF THE INVENTION

Accordingly, in one aspect the invention relates to a system for determining the level of risk posed by nanomaterials to an entity in which a risk score is calculated and subsequently used to evaluate the insurability of the entity. The system includes a memory, where a computerized model is stored, and a processor configured to retrieve from memory data related to nanomaterials associated with the entity, calculate the risk score using the computerized model and the retrieved data, evaluate the insurability of the entity responsive at least in part to the risk score, and output the results of the evaluation process as an offer or denial for insurance.

In one embodiment, the retrieved data was obtained from a questionnaire completed by the entity, an outside data source such as a private research institute or government agency, and a monitoring device located at a facility operated by the entity. The retrieved data may include physical and chemical characteristics of the nanomaterials of interest, particularly the size, shape, volume, concentration, stability, toxicity, and/or the tendency for aggregation of the nanomaterials. The system may derive values for a group of variables corresponding to risk-related characteristics of the nanomaterials from the obtained data, and base the risk score calculations at least in part on the variable values. Such variables may include quantitative representations of the risks posed by the above mentioned physical and chemical characteristics, the phase of the nanomaterials in question, the end-of-life considerations related to the nanomaterial, the level of public concern with regard to the nanotechnology or the entity, and the level of regulation governing the activities of the entity. The computerized model may calculate the risk score by taking a weighted sum of the variable values. The computerized model may be configured to change dynamically over time.

The risk score may be used at least in part in evaluating the insurability of the entity. The output of the evaluation process may be an offer for insurance and the associated premium or a denial of insurance. The system may alter the provisions of the insurance policy in response to new data obtained from the on-site monitoring devices during the term of the policy. In one embodiment, the risk score may be used in the insurability evaluation process to modify a premium previously calculated based on traditional risk factors. Insurance may be denied if the risk score is too high. A moderate risk score may have no effect on the previously calculated premium, and a lower risk score may cause a reduction in the premium value.

In another aspect, the invention relates to a method for determining the level of risk posed by nanomaterials to an entity. The method comprises obtaining data related to nanomaterials associated with the entity, calculating a risk score based on the obtained data and a computerized model, evaluating the insurability of the entity responsive at least in part to the calculated risk score, and outputting the results of the evaluation process as an offer or denial for insurance.

In one embodiment, the data is obtained from a questionnaire completed by the entity, an outside data source such as a private research institute or government agency, and a monitoring device located at a facility operated by the entity. The obtained data may comprise physical and chemical characteristics of the nanomaterials of interest, particularly the size, shape, volume, concentration, stability, toxicity, and tendency for aggregation of the nanomaterials. Values for a group of variables corresponding to risk-related characteristics of the nanomaterials may be derived from the obtained data, and the risk score calculations may be based at least in part on the variable values. Such variables may include quantitative representations of the risks posed by the above mentioned physical and chemical characteristics, the phase of the nanomaterials in question, the end-of-life conditions, the level of public concern with regard to the nanotechnology or the entity, and the level of regulation governing the activities of the entity. The computerized model may calculate the risk score by taking a weighted sum of the variable values. The computerized model may be configured to change dynamically over time.

The risk score may be used at least in part in evaluating the insurability of the entity. The output of the evaluation process may be an offer for insurance and the associated premium or a denial of insurance. The provisions of the insurance policy may be altered in response to new data obtained from the on-site monitoring devices during the term of the policy. In one embodiment, the risk score may be used in the insurability evaluation process to modify a premium previously calculated based on traditional risk factors. The insurance policy may be denied if the risk score is too high. A moderate risk score may have no effect on the previously calculated premium, and a lower risk score may cause a reduction in the premium value. The insurance policy may then be issued or renewed.

In another aspect, the invention relates to a processor-readable medium encoded with machine-readable instructions for carrying out the method described above.

BRIEF DESCRIPTION OF THE DRAWINGS

FIG. 4 is a table showing how risk scores may be derived, according to an illustrative embodiment of the invention;

DETAILED DESCRIPTION OF THE ILLUSTRATED EMBODIMENTS

Figure 1:
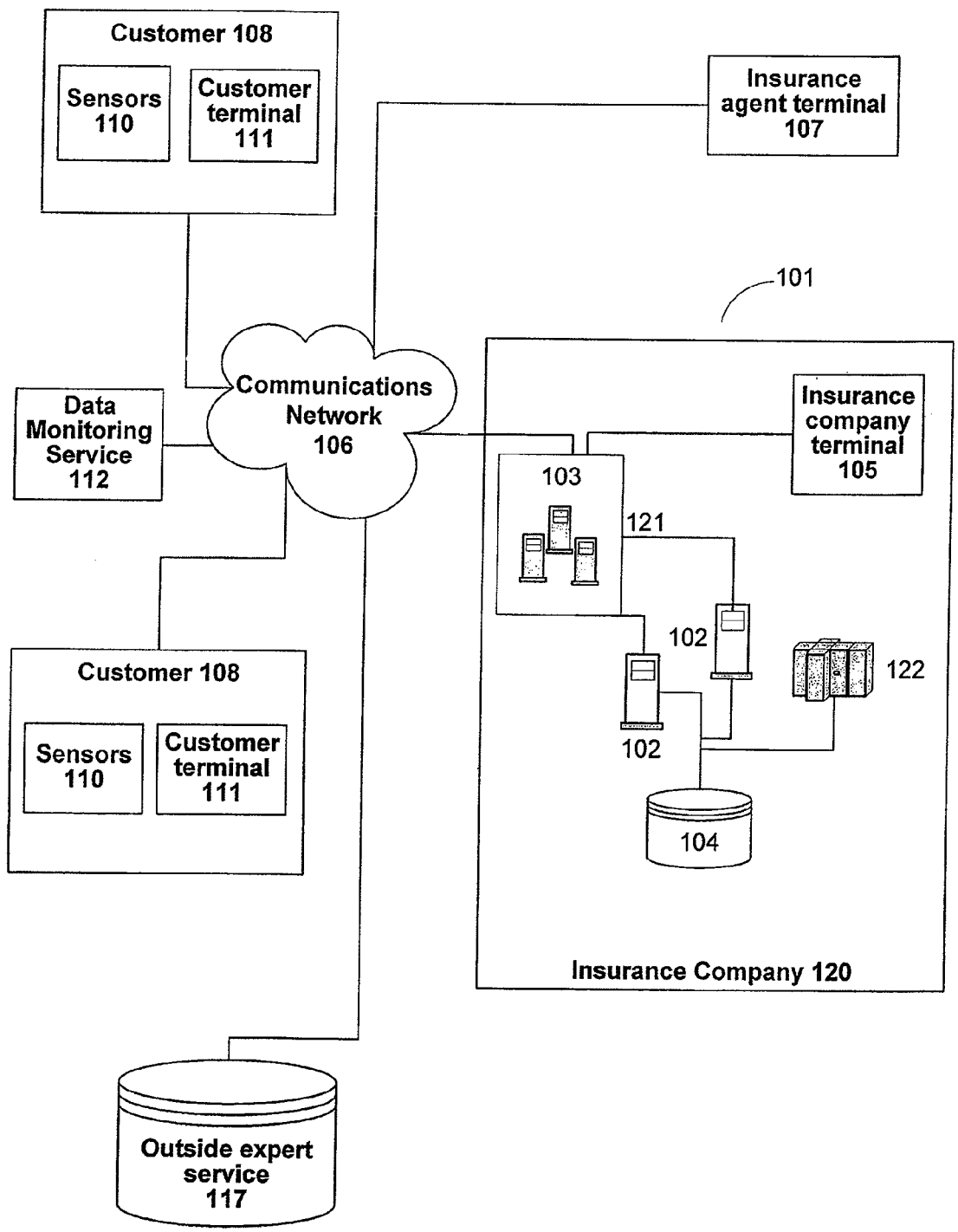
FIG. 1 is a block diagram of a system suitable for carrying out a method of nanomaterial risk evaluation, according to an illustrative embodiment of the invention.

FIG. 1 shows a block diagram of a system 100 for quantitatively evaluating risk associated with nanomaterials and underwriting an insurance policy based on that risk, according to an illustrative embodiment of the invention. In system 100, insurance company 120 is identifying and evaluating the risk posed by nanotechnology to two customers 108. Although there are two customers shown, it is understood that system 100 may be used for any number of customers. System 100 also includes a communications network 106, a data monitoring service 112, an outside expert service 117, an insurance agent terminal 107, and an insurance company computing system 101.

Customers 108 may be companies or individuals that produce or sell nanomaterial-containing products, that own facilities containing nanomaterials, or that are involved in nanotechnology in another manner. Insurance company 120 obtains nanomaterial-related information from customers 108 through customer terminals 111. Customer terminals 111 may be any general purpose computer or other computing device (e.g., a personal digital assistant or cell phone) having suitable software for interacting with communications network 106. Communications network 106 may be any appropriate wireless or wired communication network such as the internet. Customer terminals 111 may also have special-purpose software and/or a user interface that facilitates the entering and transmission of nanomaterial data.

If customers 108 own or operate facilities where nanomaterials are present, those facilities may house sensors 110 that are part of an on-site monitoring system. Sensors 110 may be provided by customer 108, insurance company 120 or an unrelated third party not shown in the figure. Sensors 110 may include differential mobility analyzers that detect nanoparticles in the air by measuring particle drift velocities under the action of an electric field, and condensation nucleus counters (CPC or CNC) that optically detect particles by activating them to droplets in a supersaturated atmosphere of alcohol. For example, a factory where nanoparticle-containing ink is manufactured may have such sensors installed as part of a hazard monitoring system. Sensors 110 may also include traditional sensors, such as thermostats and humidity meters, that measure properties that may affect the states of nanomaterials. In another scenario, a warehouse or retail store that receives, processes, or stores nanomaterial-containing products may have sensors 110 such as RFID scanners to track the merchandise. The insurance company 120 or data monitoring system 112 may be granted access to the inventory management system operated by the customer to track the volume of nanomaterial and/or nanomaterial-containing products the customer has at a given facility. This information can be used to evaluate exposure levels to employees working at the facility as well as to gauge any environmental risks that an incident at the facility may pose. Furthermore, the insurance company 120 can obtain information from the inventory management system indicating where nanomaterials are delivered or shipped to, to evaluate downstream risks of processing, shipping, or selling nanomaterials.

Insurance company 120 may obtain nanomaterial data from sensors 110 in real-time or in discrete time intervals. Data from sensors 110 may first be collected and aggregated and/or distilled by data monitoring service 112 before it is sent to insurance company 120. The data may be transmitted via any appropriate wireless or wired communications network 106.

Insurance company 120 may also obtain nanomaterial-related data from outside experts 117. Outside experts 117 may make available to the insurance company 120 databases of nanomaterial information or may perform additional analysis on data obtained from sensors 110 or other sources. Outside experts 117 may include government agencies, environmental groups, or any other appropriate authority or entity.

Insurance company 120 may have a computer system 101 that includes application servers 102, load balancing proxy servers 103, memory 104, business logic computer 122, and internal insurance company terminals 105 to perform risk evaluation and underwriting. Employees of the insurance company 120 and other authorized personnel may use insurance company terminal 105 to access the insurance company computer system 101. Insurance company terminal 105 may be any type of computing device that is configured to communicate with other computer systems. Company terminals 105 may be connected directly to application server 102, or may access an application server 102 via the load balancing proxy servers 103. Company terminals 105 may connect to load balancing proxy servers 103 via a local area network, a private data link, or via the internet. Customer terminals 111 access the application servers 102 via the load balancing proxy servers 103 over the communications network 106. The business logic computer 122 is connected to the memory 104 and application servers 102 over a local area network 121. In addition, other network infrastructure, including, for example a firewall, backup servers, and back up data stores, may also be included in the system 101, without departing from the scope of the invention. Communications over the local area network 121 and/or over the Internet, in one implementation, may be encrypted. In addition, such communications, whether encrypted or not, may also be digitally signed for authenticating the source of the communications. The computer system 101 may also include a certificate authority to authenticate one or more of the communications using public key infrastructure.

In general, the company terminals 105 and the customer terminals 111 can be any general purpose computer or other computing device (e.g., a personal digital assistant or cell phone) having suitable software for interacting with software operating on the application servers 102. One suitable device is described further in relation to FIG. 2. In one implementation, the terminal software includes a web browser. In such an implementation, upon entering the URL of a corresponding insurance company website, one of the load balancing proxy servers 103 assigns an application server 102 to interact with the terminal 105 or 111. The load balancing proxy server 103 selects an application server 102 based on the current load of the available application servers 102. The assigned application server 102 then generates a series of web pages for presentation via the web browser of the terminal 105 or 111 for review of and interaction with the user of the terminal 105 or 111. One illustrative web page suitable for presentation to a user in a terminal 105 or 111 to obtain information about nanomaterials handled by a customer is a questionnaire, depicted in FIG. 5 and described further below.

Based on the nanomaterial data collected from the various sources described above, business logic computer 122 performs risk evaluation and policy underwriting. Business logic computer 122 may be implemented based on the computer network system architecture shown in FIG. 2. Business logic computer 122 may have data storage capabilities of its own, or may access memory 104 for such purposes. In one implementation, memory 104 is a data warehouse utilized by the insurance company 120. The data warehouse is the main electronic depository of the insurance company's current and historical data. The data warehouse includes one or more interrelated databases that store information relevant to insurance data analysis. The interrelated databases store both structured and unstructured data. In one implementation, one or more of the interrelated databases store electronic copies of insurance forms, either in an image format or a text-searchable format keyed to a customer or claim. Other databases in the interrelated databases store data, for example, in a relational database, in various data fields keyed to various identifiers, such as, without limitation, customer, data source, geography, or business identifier (such as Standard Industry Classification Code). The information stored in the data warehouse 102 is obtained through communications with customers, agents, vendors, sensors, and third party data providers and investigators. In particular, the data warehouse is configured to store data about customer and non-customer nanomaterial use and exposure, as well as related loss information, if any. Preferably, the computations required for risk evaluation and underwriting are primarily carried out by business logic computer 122, in order to free up the other resources for other tasks. The processes performed by business logic computer 122 in an illustrative embodiment of the invention are described below in relation to FIG. 3.

In one implementation, software operating on the application servers 102 act merely as presentation and data extraction and conversion servers. All substantive business logic, including underwriting and pricing determinations, is carried out on the business logic computer 122. In this implementation, the application servers 102 obtain data from the database 104 and the business logic computer and incorporate that data into web pages (or other graphical user interface formats). These web pages are then communicated by the application servers 102 through the load balancing proxy servers 103 to terminals 111 and 107 for presentation. Upon receiving input from the terminals 111 or 107, the application server 102 translates the input into a form suitable for processing by the business logic computer and for storage by the database 104. In this implementation, the application servers can be operated by third parties, for example, independent agents, who can add their own branding to the web pages or add other customized presentation data. In the alternative, at least some of the business logic is also carried out by the application servers 102.

In another implementation, the application servers 102 are software modules operating on one or more computers. One of the computers on which the application servers 102 are operating may also serve as the business logic computer 122 and/or as a load balancing proxy server 103.

A separate insurance agency or individual insurance agent may also have access to the insurance company system 101. This may be accomplished via insurance agent terminal 107. Insurance agent terminal 107 may be any appropriate type of computing device that is configured to interact with communications network 106, such as the devices described in relation to FIG. 2.

In other implementations, the software operating on the terminals 105, 111, and 107, includes a thin or thick client application in addition to, or instead of web browser. The thin or thick client application interfaces with a corresponding server application operating on the application server 102.

Figure 2:
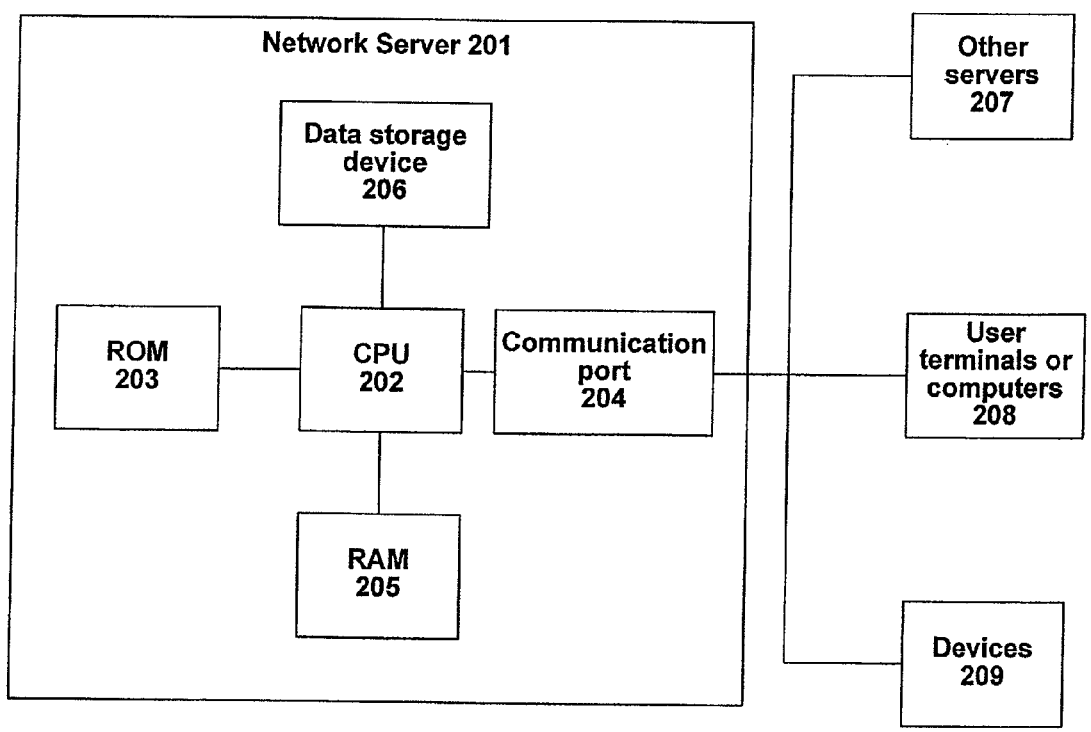
FIG. 2 is a block diagram of a computer network system that may be used in an embodiment of the invention.

FIG. 2 shows a block diagram of a computer network system that may be used by the insurance company 120 to process nanomaterial data, evaluate risk, and underwrite an insurance policy. Computer network server 201 comprises at least one central processing unit (CPU) 202, at least one read-only memory (ROM) 203, at least one communication port or hub 204, at least one random access memory (RAM) 205, and one or more databases or data storage devices 206. All of these later elements are in communication with the CPU 202 to facilitate the operation of the network server 201. The network server 201 may be configured in many different ways. For example, network server 201 may be a conventional standalone server computer or alternatively, the function of server may be distributed across multiple computing systems and architectures.

Network server 201 may also be configured in a distributed architecture, wherein databases and processors are housed in separate units or locations. Some such servers perform primary processing functions and contain at a minimum, a RAM 205, a ROM 203, and a general controller or processor 202. In such an embodiment, each of these servers is attached to a communications hub or port 204 that serves as a primary communication link with other servers 207, client or user computers 208 and other related devices 209. The communications hub or port 204 may have minimal processing capability itself, serving primarily as a communications router. A variety of communications protocols may be part of the system, including but not limited to: Ethernet, SAP, SAS™, ATP, Bluetooth™, GSM and TCP/IP.

The CPU 202 comprises a processor, such as one or more conventional microprocessors and one or more supplementary co-processors such as math co-processors. The CPU 202 is in communication with the communication port 204 through which the CPU 202 communicates with other devices such as other servers 207, user terminals 208, or devices 209. The communication port 204 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 206. The data storage device 206 may comprise an appropriate combination of magnetic, optical and/or semiconductor memory, and may include, for example, RAM, ROM, flash drive, an optical disc such as a compact disc and/or a hard disk or drive. The CPU 202 and the data storage device 206 each may be, for example, located entirely within a single computer or other computing device; or connected to each other by a communication medium, such as a USB port, serial port cable, a coaxial cable, a Ethernet type cable, a telephone line, a radio frequency transceiver or other similar wireless or wired medium or combination of the foregoing. For example, the CPU 202 may be connected to the data storage device 206 via the communication port 204.

The data storage device 206 may store, for example, (i) a program (e.g., computer program code and/or a computer program product) adapted to direct the CPU 202 in accordance with the present invention, and particularly in accordance with the processes described in detail hereinafter with regard to the CPU 202; (ii) databases adapted to store information that may be utilized to store information required by the program. Suitable databases include an insurance subscriber database and a nanomaterial database, and the databases include multiple records, each record including fields specific to the present invention such as premiums, locations, payouts, claims, nanomaterial exposure levels, nanomaterial characteristics, nanomaterial regulation levels, public perception levels, etc.

The program may be stored, for example, in a compressed, an uncompiled and/or an encrypted format, and may include computer program code. The instructions of the program may be read into a main memory of the processor from a computer-readable medium other than the data storage device 206, such as from a ROM 203 or from a RAM 205. While execution of sequences of instructions in the program causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as processing data associated with nanomaterials, where processing data may include aggregating raw data according to a particular formula. Computer program code may also be provided for calculating a risk score from the nanomaterial data, where the risk score is calculated according to a model that is stored as program code or in some other manner. Furthermore, computer program code may be provided for underwriting or modifying an insurance policy based on a risk score, and outputting the result to a display or in some other manner. The program also may include program elements such as an operating system, a database management system and "device drivers" that allow the processor to interface with computer peripheral devices (e.g., a video display, a keyboard, a computer mouse, etc.).

The term "computer-readable medium" as used herein refers to any medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read.

Various forms of computer readable media may be involved in carrying one or more sequences of one or more instructions to the processor 202 (or any other processor of a device described herein) for execution. For example, the instructions may initially be borne on a magnetic disk of a remote computer 208. The remote computer 208 can load the instructions into its dynamic memory and send the instructions over an Ethernet connection, cable line, or even telephone line using a modem. A communications device 204 local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

As previously discussed with reference to FIG. 1, servers 102 may also interact and/or control one or more user devices or terminals such as, e.g., terminals 105, 107, and 111. The terminals may include any one or a combination of a personal computer, a laptop, a personal digital assistant, a mouse, a keyboard, a computer display, a touch screen, LCD, voice recognition software, or other generally represented by input/output devices required to implement the above functionality.

Figure 3:
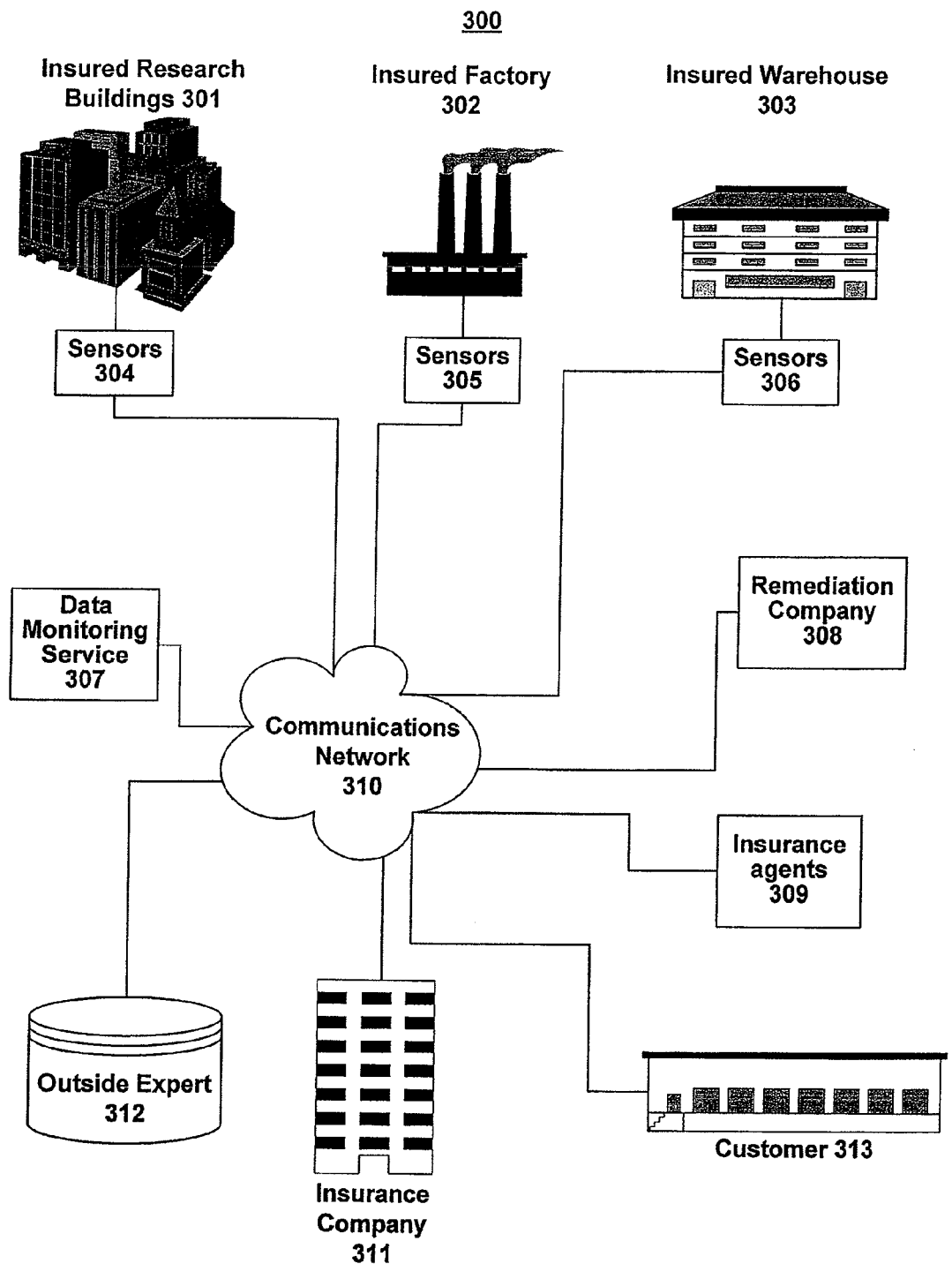
FIG. 3 is a block diagram of a first nanomaterial risk evaluation scenario, according to an illustrative embodiment of the invention.

FIG. 3 shows a schematic diagram of an illustrative nanomaterial risk evaluation scenario where buildings 301-303 are insured by insurance company 311. Insured buildings 301-303 may be owned by, operated by, or in some other manner associated with one or multiple customers 313. For exemplary purposes, insured building 301 is a research facility that works with nanomaterials. For example, nanomaterial research may be conducted in research facility 301. Building 302 is a factory where products containing nanomaterials are produced. Factory 302 may be, for example, an ink or paint factory. Building 303 is a warehouse where nanomaterial-containing products are stored. Other types of buildings that are not shown, such as retail buildings, office buildings, apartment buildings, and homes may also be insured according to principles described herein. Risks associated with insured buildings 301-303 include health risks to building occupants and employees of the entity; product liability; general liability; and possible environmental damage caused by nanomaterials due, for example, to building operations, in the event of an accident or due to product disposal at the end of a product's life cycle.

Nanomaterial sensors 304-306 are located at their respective buildings. Each sensor 304-306 may represent one or multiple sensors. Sensors 304-306 may, for example, include differential mobility analyzers, CNCs, RFID scanners, thermostats, and humidity meters, as discussed above in relation to FIG. 1. Data from sensors 304-306 are transmitted to data monitoring service 307 in real-time, once a day, or at some other discrete time interval. The data may be transmitted via any appropriate wireless or wired communications network 310. Data monitoring service 307 aggregates the data from the various sensors and provides it to insurance company 311 as a collection. Data monitoring service may also, or in the alternative, process the data to provide a distillation of the data. This may occur in real-time or at a discrete time interval such as once a day. Data monitoring service 307 may also perform preliminary analysis of the data and provide a report of the results to insurance company 311. Data monitoring service 307 may be part of customer's on-site monitoring system, an off-site facility operated by customer 313, or a facility operated by a third party that is hired by the customer 313 or insurance company 311. Data monitoring service 307 may use supervisory control and data acquisition (SCADA) and analysis software to collect, record, store, present, and analyze data collected from sensors 304-306 and other digital devices. Alternatively, data from sensors 304-306 may be sent directly to insurance company 311 without utilizing data monitoring service 307.

Remediation company 308 may also receive raw data from sensors 304-306 and/or aggregated or distilled data from data monitoring service 307. Remediation company 308 may be mobilized to contain a hazard or threat that is detected at insured buildings 301-303.

Insurance company 311 may also receive nanomaterial information from outside expert 312. Outside expert 312 may be an organization that provides expert knowledge on nanomaterials or a database that contains expert knowledge on nanomaterials. Outside expert 312 may include independent research groups, government regulatory agencies, or other organizations with the appropriate expertise. The data provided by outside expert 312 may be used to supplement data from sensors 304-306, or may be used in place of absent or inconclusive sensor data. Outside expert 312 may provide data accumulated from prior experiences with nanomaterials or may provide theoretical data and predicted effects. The communications network 310 used to transmit such data may be any suitable wireless or wired communications network.

Figure 5:
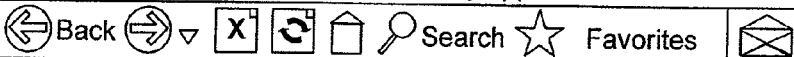
FIG. 5 is an illustrative user interface suitable for carrying out aspects of the invention, according to an illustrative embodiment of the invention.

Customer 313 may also provide data to insurance company 311 directly. The data may be provided in response to solicitation by insurance company 311 or it may be provided voluntarily by the customer. Insurance company 311 may solicit data by providing customer 313 with a questionnaire. The questionnaire may be provided electronically to any appropriate computing device accessible by customer 313. The questionnaire may also be provided on paper to the customer. The customer's reply may then be manually entered into insurance company's computing system. A portion of an illustrative questionnaire is shown in FIG. 5.

If the data obtained from the sources described above is insufficient for performing risk evaluation, insurance company 311 may perform an on-site loss control investigation where a team from insurance company 311 or a third party entity goes to insured buildings 301-303 to perform risk evaluation. This process may include taking soil and water samples from the land around buildings 301-303, air samples from inside buildings 301-303, samples of any nanomaterial-containing products. These samples may then be subjected to in-depth analysis to determine certain properties of the present nanomaterials. Examples of such analysis include imaging, acoustic spectrometry, and particle size analysis. Techniques for performing particle size analysis include size sieving, gravity and centrifugal sedimentation, and capillary hydrodynamic and sedimentation field flow fractionation. Recent product developments from Malvern Instruments and Beckman Coulter both utilize image analysis to determine particle size and shape. Beckman's RapidVUE image analyzer uses video imaging to create a digital picture of the particles in the 20-2,000 micron range. Malvern's Sysmex FPIA-2100 analyzes particle shape and size with a camera and microscope to measure 0.7-160 micron sized particles. Other types of analysis tools include Malvern's Ultrasizer SV, which employs ultrasonic spectroscopy to determine particle size and shape. The data from the loss control investigation may be combined with the data obtained from other sources and used in performing risk evaluation. It is contemplated that such additional risk evaluation procedures such as the particle size analysis may be automated and configured to provide additional data collection automatically without requiring a separate on-site visit through automated analysis components that can communicate with insurance company 311.

After acquiring nanomaterial-related data from the various sources described above, insurance company 311 uses a computing system such as business logic processor 122 to process the received data and calculate a nanomaterial risk score for each customer 313 or each individual insured facility 301-303. The calculations may be performed using a special-purpose computer model implemented in hardware or software as part of the insurance company's computing system. In one embodiment of the invention, the insurance company's computing system may be system 101 of FIG. 1.

The types of data insurance company 311 uses to calculate the risk score include physical characteristics of the nanomaterial, such as size, shape, volume, density, viscosity, concentration, and specific gravity, and chemical characteristics such as toxicity, reactivity, acidity, alkalinity, solubility, and combustibility. Some characteristics that may be used may be a combination of chemical and physical properties, such as nanoparticles' tendency for aggregation and their colloidal properties. Other data that may be taken into account include handling risk, level of encasement, material phase, end-of-life concerns, type of insurance coverage, regulatory regime, and public perception. Handling risk describes the likelihood that nanomaterials in a product may harm people that are handling it. People who might handle such products include the employees of the insured customer 313 and the consumers who buy the product. The encasement level of a nanomaterial refers to how enclosed the nanomaterial is in a product. For example, loose nanoparticles found in paint are less encased than nanomaterials within the structure of a baseball bat. The material phase of a nanomaterial describes the form it is in while it is associated with insured customer 313. Nanomaterials may be used or handled in an unprocessed form, as nano-intermediates, or as nano-enabled products. Nanomaterials that are already incorporated into a product generally pose less risk than nanomaterials in an unprocessed form, which may be found in research building 301 or factory 302, for example. End-of-life concerns refer to the hazards posed by the disposal or break-down of nanomaterial-containing substances. For example, the incineration of certain types of nanomaterials may pose an environmental hazard. The types of data that are considered and the weight put on each in calculating the risk score may vary depending on the type of insurance coverage. For example, handling risk may be particularly important in underwriting a worker's compensation policy. Toxicity may be most important in products liability coverage. The existence of strong regulatory regimes may lessen the risks posed by nanomaterials by providing oversight and decreasing the probability of accidents. Finally, the public's perception of a particular nanotechnology or company may be taken into account when calculating the risk score. While public perception is not related to the inherent dangers of a particular nanotechnology, a negative public perception of either the technology or the insured company 313 may increase the likelihood of lawsuits in the event of a loss, regardless of the underlying merits of the claims asserted in such lawsuits.

In calculating the risk score from the collected data, insurance company 311 may first calculate values for a group of intermediate variables that capture the most important information in the data. For example, "the presence of nanomaterials" may be an intermediate variable whose value is derived from the toxicity, volume, level of encasement, and handling risk data of the nanomaterial. However, an intermediate variable may also correspond to only one type of data, such as a toxicity intermediate variable.

Because nanotechnology is such a cutting-edge field, it is sometimes difficult to obtain exact quantitative measurements of certain data and intermediate variables. For example, the toxicity of a particular nanomaterial may be unknown or known only to a certain degree of accuracy. Furthermore, certain data types are qualitative in nature, such as public perception. Since the risk score is a number and is computed quantitatively, all the data and/or intermediate variables are converted to numbers.

FIG. 4 is a table 400 and narrative key 401 that demonstrates how data and/or intermediate variables may be represented, according to an illustrative embodiment of the invention. In this scenario, exact numbers for the variables 402 are not known. Instead, only the approximate range (i.e., low/medium/high) is known. Narrative key 401 demonstrates how qualitative data and data without numerical precision may be converted into numbers for the purpose of calculating a risk score. For example, nanomaterial 1 has moderate handling risk, which is a qualitative concept. The handling risk variable is thus assigned to 2, as suggested by the narrative key 401. In another example, there is a quantity of nanomaterial 2 in a particular insured building that measures in the kilogram range. It is unknown exactly how many kilograms are present. As suggested by the narrative key 401, the volume/quantity variable for nanomaterial 2 is equal to 3. The numerical values of all the variables may then be combined per a computerized model to generate the risk score 403. One method of combining the variables 401 is to compute a weighted sum, where the weights are determined retrospectively using e.g., regression analysis from a database of nanomaterial data. The database may be part of insurance company's computing system, e.g. memory 104, or may be provided by an outside source. The computerized model scales the weighted sum to confine the risk score 403 within a desired range. In table 400, the risk scores 403 were scaled to stay between 200 and 900. The numbers, ranges, and variables shown in table 400 are merely illustrative; it is understood that the numbers, ranges, and variables may be different in another application. Furthermore, it is understood that as more data about nanomaterials is obtained, the model may be modified to incorporate more classes per variable and to have weights adjusted accordingly.

Referring back to FIG. 3, insurance company 311 may use the computed risk score 403 to underwrite an insurance policy for the customer 313 or for a particular insured building 301-303. The underwriting may be performed by an automatic system implemented in insurance company's computing system, such as business logic computer 122 in FIG. 1. In an alternative embodiment, the underwriting may include a human underwriter interacting with the computing system. For example, the human underwriter may determine qualitative evaluations of one or more of the variables described above. In addition, the human underwriter may evaluate the output of the computing system for making a final insurability or rating decision. The results of the underwriting may be presented electronically to the customer 313, or may be given to independent or affiliated insurance agents 309 to present to the customer 313. The output of the underwriting may be presented in any suitable manner, including on an electronic display or on paper. The output may also be electronically directed to a printer for printing or to an email application. The output may be a denial for insurance, a rating of insurability, or an offer for insurance or renewal including a premium determined based on the underwriting.

An insurance application may be issued, modified, or rejected depending on the risk score 403 of customer 313. The application may be for a new or renewal policy. The policy may be updated in real-time or at a certain discrete time intervals as new data from customer 313 or sensors 304-306 arrive.

FIG. 5 is an illustrative graphical user interface, in this instance, a web page 500 questionnaire, suitable for obtaining nanomaterial related information from customers, according to an illustrative embodiment of the invention. The web page 500 includes a series of questions related to nanomaterials. Customers utilize web page 500 to enter any information they have about the nanomaterials that they are associated with. The data that they enter may supplement data obtained from on-site sensors, on-site investigations, and outside sources, as previously discussed in relation to FIG. 3.

Referring back to FIG. 1, based on the information provided via the web page and data obtained from other sources, the business logic computer 122 carries out an underwriting and pricing process through which the computer system 101 determines whether to offer new coverage to a customer, and if so at what price. For existing policies adjusted by a user via the system 100, the business logic computer 122 determines whether the adjustments merit a change in insurance premium. The insurance company may grant a discount to a customer for having a party, other than the insurance company, monitor the nanomaterial risk associated with the customer. The discount may vary based on the types of nanomaterial present, how the nanomaterials are used, and other factors as discussed previously in relation to FIG. 3. The exact value of the discount may be determined according to a set of pricing rules, or by processing a set of intermediate variables with a statistical predicative model. In alternative embodiments, discounts, if any, are determined based on sensor data received, either in raw, aggregated, or distilled form. For example, if a customer manufactures a product including nanomaterials that tend to have a high risk of the nanomaterials becoming airborne, sensor data indicating lower than expected particle levels in the air may warrant a premium discount. Similarly, output from an inventory management system demonstrating that raw materials are kept in inventory for a minimal amount of time prior to encapsulation would warrant a discount relative to a company carrying out the same process that maintains substantial stockpiles of raw nanomaterial. Additional discounts may be provided to the customer by having the customer or other third party validate that the actual sensors themselves are being maintained and are providing accurate data regarding the nanomaterials.

The output of the underwriting and pricing processes is then output to the customer terminals 111 or insurance agent terminals 107. In one implementation, for requests for new policies and renewals, the output takes the form of a web-based determination of insurability or an actual offer for insurance including a corresponding premium amount, an option to bind the policy, and functionality to accept payment from the customer for the new policy. For policy adjustments, the output takes the form of a web page displaying an updated premium. In either case, the resulting web page, in one implementation, includes suggestions as to how a user can obtain further discounts. The web page may provide specific recommendations on nano-sensor devices such as differential mobility analyzers, CNCs, RFID scanners, thermostats, and humidity meters that are most appropriate for the types of nanomaterials at hand, and their corresponding discounts to the provided premium. The web page may also provide safety and hazard containment suggestions, such as installing negative-pressure isolation systems and air filters, and improving accessibility to masks and environmental suits.

Figure 6:
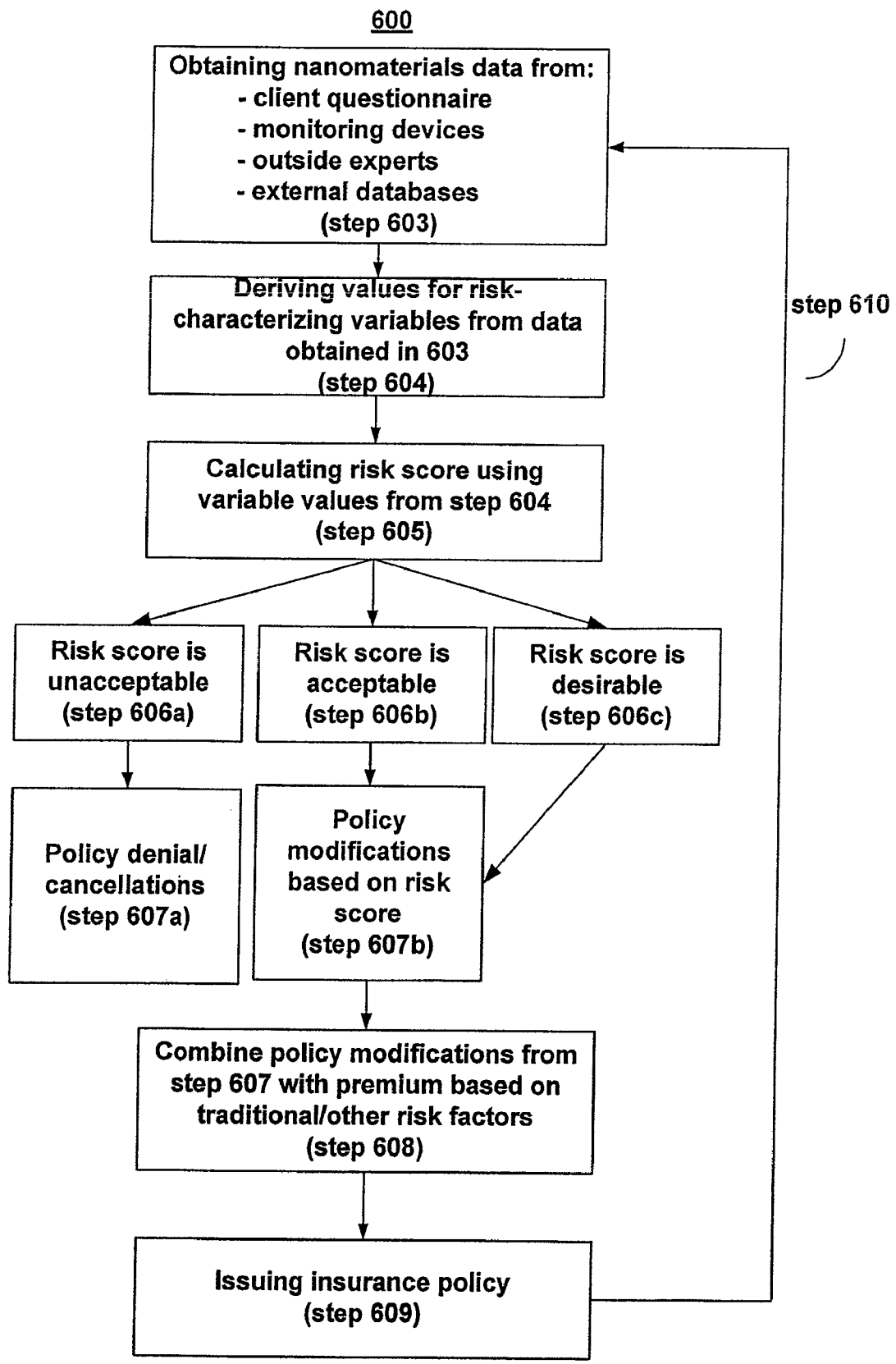
FIG. 6 is a flowchart of a method of nanomaterial risk evaluation, according to an illustrative embodiment of the invention.

FIG. 6 shows a flowchart of a method of nanomaterial risk evaluation 600, according to an illustrative embodiment of the invention. The entity being insured may be an individual or an organization that produces, sells, researches, or handles in some other way nanomaterials. The entity may also own or operate facilities where nanomaterials are present. At step 603, the insurance company obtains nanomaterial-specific data related to the customer from a variety of sources. These sources may include client questionnaires, sensors, and monitors located in or remote from customer-operated facilities, outside experts, or other external sources of information. Outside experts may include private research services, government agencies, or databases of collected nanomaterial information. The data may be collected by the insurance company in real-time, or at discrete time intervals throughout the term of the insurance policy.

The data may be in a raw form, or may be preprocessed by a data monitoring service or outside expert. The obtained data may include physical characteristics of the nanomaterial, such as size, shape, volume, density, viscosity, concentration, and specific gravity, or chemical characteristics such as the toxicity, reactivity, acidity, alkalinity, solubility, and combustibility, as described previously in relation to FIG. 3.

Optionally at step 604, values for intermediate variables that characterize nanomaterial risk are derived from the collected data. Examples of intermediate variables include toxicity and volume of the nanomaterials, the level of encasement of nanomaterial in products, the level of risk in how the nanomaterials are handled, and the stage of production that nanomaterial-containing products are in. Intermediate variables may also include the level of risk associated with the end-of-life conditions, the level of regulatory regime present, and a measure of the public's perception of the particular nanotechnologies being used, as discussed previously.

At step 605, the intermediate variable values from step 604 may be used to calculate a total risk score associated with the customer or insured facility. In one embodiment, the risk score is calculated by taking the weighted sum of the intermediate variable values from step 604, where the weights are determined retrospectively e.g., using regression analysis from a database of nanomaterial data. Alternatively, the total risk score may be computed directly from the data collected at step 603.

Depending on the value of the computed risk score, the risk score may be determined to be unacceptable (step 606*a*), acceptable (step 606*b*), or desirable (606*c*). This determination may be done automatically by an insurance company computing system or program, such as business logic computer 122, or may be decided upon by an insurance agent or insurance company employee. Although there are only three categories shown in the figure, the risk score may be characterized into any number of categories, or may be considered a continuous real number.

If the risk score is decided to be unacceptable, then the customer may be denied an insurance policy at step 607*a*. If a policy already exists, a renewal may be declined. If the risk score is decided to be acceptable or desirable, appropriate modifications, if any, to premiums based on the risk score may be determined at step 607*b*. The premium may be reduced if the risk score is favorable, or it may be increased if the risk score is unfavorable (though still acceptable). The premium may not be altered at all if the risk score is moderate or inconclusive. Furthermore, different types of coverage policies, such as general liability or worker's compensation, may be selectively offered or denied in response to the risk score. In addition, the premium modifications in one embodiment of the invention may be contingent on the entity satisfying a condition, such as installing concentration sensors in an entity-operated facility within 30 days.

At step 608, any modifications made in step 607 may be combined with premium determinations made based on risk factors unrelated to nanomaterials in a separate underwriting process. The final policy may then be issued at step 609.

If the data collected at step 603 changes during the term of an issued insurance policy at step 610, the risk score may be reevaluated based on the new data. Accordingly, the insurance policy may be modified and reissued or even canceled. Reevaluation of risk may occur in real-time as data is collected in real-time, or may occur at discrete time intervals throughout the term of the policy. Steps 603-609 may thus be repeated many times during the term of an insurance policy.

What is claimed is:

1. A system for determining a level of risk posed by a nanomaterial to an entity, the system comprising:
   a memory;
   a computerized model stored on the memory; and
   a processor configured to:
   retrieve from memory data related to the nanomaterial, the retrieved data including physical and chemical characteristics of the nanomaterial;
   calculate, using the computerized model, a risk score that is indicative of the level of risk posed by the nanomaterial to the entity based on the retrieved data, wherein the risk score is calculated based at least in part on a quantitative representation of the risks posed by the nanomaterial based on the physical and chemical characteristics of the nanomaterial;
   evaluate the insurability of the entity responsive at least in part to the calculated risk score; and
   output the results of the evaluation process as an offer or denial for insurance.

2. The system of claim 1, wherein the physical and chemical characteristics of the nanomaterial included in the retrieved data include the size, shape, volume, concentration, stability, toxicity, and tendency for aggregation of the nanomaterial.

3. The system of claim 1, wherein the processor is configured to derive values for a group of variables corresponding to risk-related characteristics of the nanomaterial, and wherein the processor is configured to calculate the risk score at least in part based on the values derived for the group of variables.

4. The system of claim 1, wherein the processor is configured to derive the quantitative representation at least in part based on the toxicity of the nanomaterial handled by the entity.

5. The system of claim 3, wherein the values for the group of variables comprise a quantitative value assigned to a phase variable indicating the phase the nanomaterial is in when handled by the entity, wherein one value is assigned to the phase variable if the nanomaterial is handled by the entity in an unprocessed form, a second value is assigned to the phase variable if the nanomaterial is handled by the entity as an intermediate product, and a third value is assigned to the phase variable if the nanomaterial is handled by the entity as an end product.

6. The system of claim 3, wherein the values for the group of variables comprise a quantitative representation of the risk posed by an end-of-life condition of the nanomaterial.

7. The system of claim 3, wherein the values for the group of variables comprise a quantitative indication of a level of public concern associated with the nanomaterial or the entity.

8. The system of claim 3, wherein the values for the group of variables comprise a quantitative representation of a regulatory regime governing the activities of the entity.

9. The system of claim 3, wherein the processor is configured to calculate the risk score using the computerized model by taking a weighted sum of the values of the group of variables.

10. The system of claim 1, wherein the retrieved data was obtained from a monitoring device located at an entity's facility during a term of the insurance, and wherein the processor is configured to alter a provision of the insurance in response to the obtained data.

11. The system of claim 1, wherein the retrieved data was obtained from a questionnaire completed by the entity, an outside data source, and a monitoring device located at an entity's facility.

12. The system of claim 1, wherein the risk score is used in the evaluation process to modify an insurance premium calculated based on traditional risk factors.

13. The system of claim 12, wherein the insurance is denied if the risk score is high, the insurance premium is unchanged if the risk score is moderate, and the insurance premium is reduced if the risk score is low.

14. A method for determining a level of risk posed by a nanomaterial to an entity, the method comprising:
receiving data related to the nanomaterial, the received data including physical and chemical characteristics of the nanomaterial; and
storing the received data in a database in communication with a processor;
accessing, by the processor, the stored data to calculate using a computerized model, a risk score that is indicative of the level of risk posed by the nanomaterial to the entity based on the received data, wherein the risk score is calculated based at least in part on a quantitative representation of the risks posed by the nanomaterial based on the physical and chemical characteristics of the nanomaterial;
determining, by the processor, the insurability of the entity responsive at least in part to the calculated risk score; and
electronically outputting, by the processor, an offer or denial for insurance based on the determined insurability of the entity.

15. The method of claim 14, wherein receiving the data comprises obtaining, by the processor, the physical and chemical characteristics of the nanomaterial.

16. The method of claim 14, wherein calculating the risk score comprises deriving a quantitative value to a phase variable indicating the phase the nanomaterial is in when handled by the entity, wherein one value is assigned to the phase variable if the nanomaterial is handled by the entity in an unprocessed form, a second value is assigned to the phase variable if the nanomaterial is handled by the entity as an intermediate product, and a third value is assigned to the phase variable if the nanomaterial is handled by the entity as an end product.

17. The method of claim 14, comprising altering, by the processor, a provision of the insurance in response to the data obtained from a monitoring device monitoring a location of the entity, wherein the data was obtained from the monitoring device during a term of the insurance.

18. The method of claim 14, comprising calculating, by the processor, a total premium for the insurance, wherein calculating the total premium includes modifying an insurance premium calculated based on traditional risk factors.

19. A system for determining a level of risk posed by a nanomaterial to an entity, the system comprising:
a memory;
a computerized model stored on the memory; and
a processor configured to:
retrieve from memory data related to the nanomaterial, the retrieved data including physical and chemical characteristics of the nanomaterial;
calculate, using the computerized model, a risk score that is indicative of the level of risk posed by the nanomaterial to the entity based on the retrieved data, wherein the risk score is calculated based at least in part on a quantitative representation of the risks posed by the nanomaterial based on the physical and chemical characteristics of the nanomaterial;
evaluate the insurability of the entity responsive at least in part to the calculated risk score, wherein the risk score is used in the evaluation process to modify an insurance premium calculated based on traditional risk factors; and
output the results of the evaluation process as an offer or denial for insurance.

* * * * *